United States Patent Office 3,185,711

Patented May 25, 1965

1

3,185,711
OXOBUTYROLACTONES

Harold G. Monsimer, Philadelphia, Pa., assignor to Richardson-Merrell Inc., New York, N.Y., a corporation of Delaware No Drawing. Filed Sept. 19, 1963, Ser. No. 310,159
3 Claims. (Cl. 260—343.6)

This invention relates to substituted 2-oxobutyrolactone derivatives. Specifically this invention relates to 4-substituted-3-carbethoxy - 2 - oxobutyrolactone derivatives which have useful antiviral activity.

The novel compounds described by the present invention are those corresponding to the formula:

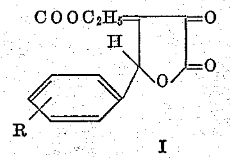

I wherein R may be halogen or acylamino.

The compounds of this invention may be synthesized by reacting an appropriate aldehyde with the sodium salt of diethyloxalacetate:

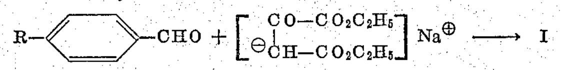

The reaction may be advantageously carried out at temperatures ranging from 20 to 100° C. for a period of four to forty-eight hours in a solvent medium such as methanol, ethanol, benzene, toluene, and the like.

The invention oxobutyrolactones were found to exhibit useful antiviral activity and low toxicity when tested against the PR–8 strain of influenza virus by the twenty-four hour mouse test (lung titrations), ten day survival test on infected mice (pre- and post-treatment) and in vitro and in vivo (ovo) test in embryonated chicken eggs methods.

The following examples illustrate specific embodiments of the present invention.

EXAMPLE 1

*3-carbethoxy-4-(p-acetamidophenyl)-2-oxobutyrolactone*

*Procedure A.*—A mixture of sodium diethyloxalacetate (103 grams, 0.49 mole) and p-acetamidobenzaldehyde (90 grams, 0.55 mole) in 800 milliliters of ethanol was stirred for twenty-six hours at room temperature, and then for four hours at 40–50° C. The solvent was removed under reduced pressure and 50 milliliters of concentrated hydrochloric acid was added with stirring and cooling. The reaction mixture was extracted with methylene chloride to remove organic materials. The desired product was extracted from the methylene chloride by several washings with sodium bicarbonate solution. Acidification of the alkaline solution with dilute hydrochloric acid resulted in the separation of a gum which was taken up in methylene chloride and washed with water. The solvent was removed and the residue crystallized from ethanol to give 3-carbethoxy-4-(p-acetamidophenyl)-2-oxobutyrolactone melting at 177–179° C.

*Analysis.*—Calcd. for $C_{15}H_{15}NO_6$: C, 59.01; H, 4.95; N, 4.59. Found: C, 58.76; H, 5.02; N, 4.33.

*Procedure B.*—A solution of 3-carbethoxy-4-(p-nitrophenyl)-2-oxobutyrolactone (30 grams, 0.1 mole) in 400 milliliters of ethanol containing 12 milliliters of concentrated hydrochloric acid was hydrogenated employing 1 gram of 10 percent palladium on charcoal as catalyst at room temperature and 60 pounds of hydrogen pressure. After the theoretical amount of hydrogen was consumed, the catalyst was removed by filtration, and 3-carbethoxy-4-(p-aminophenyl) - 2 - oxobutyrolactone hydrochloride crystallized from the alcohol solution on standing.

2

A mixture of 1 gram of the above hydrochloride, 0.25 milliliter of acetyl chloride and 0.30 milliliter of pyridine in 100 milliliters of benzene and 50 milliliters of methylene chloride was stirred at room temperature for a period of eighteen hours. The reaction mixture was washed with 50 milliliters of 10 percent hydrochloric acid and the solvent was removed under vacuum. The residue crystallized from ethanol-water to yield 3-carbethoxy-4-(p-acetamidophenyl) - 2 - oxobutyrolactone melting at 171–175° C. A mixture melting point with material obtained by procedure A was not depressed.

*Preparation of 3-carbethoxy-4-(p-nitrophenyl)-2-oxobutyrolactone*

A mixture of 15.8 grams (0.1 mole) of p-nitrobenzaldehyde and 19.7 grams (0.094 mole) of sodium diethyloxalacetate in 100 milliliters of ethanol was stirred at room temperature for a period of twenty-four hours. The solvent was removed under reduced pressure and 100 milliliters of ether, 10 milliliters of concentrated hydrochloric acid, and 100 grams of ice were added to the residue. After stirring for thirty minutes, the layers were separated and the aqueous layer extracted with two 100 milliliter portions of ether. The combined ether extracts were dried over anhydrous magnesium sulfate and evaporated to dryness. The residue was crystallized from ethanol to give 3-carbethoxy-4-(p-nitrophenyl)-2-oxobutyrolactone melting at 125–126° C.

*Analysis.*—Calcd. for $C_{13}H_{11}NO_7$: C, 53.24; H, 3.78; N, 4.78. Found: C, 52.90; H, 3.71; N, 4.66.

EXAMPLE 2

*3-carbethoxy-4-(p-fluorophenyl)-2-oxobutyrolactone*

A mixture of p-fluorobenzaldehyde (12.5 grams, 0.1 mole) and sodium diethyl oxalacetate (21 grams, 0.1 mole) in 100 milliliters of ethanol was stirred for a period of thirty hours at room temperature. The solvent was removed under reduced pressure and 20 milliliters of concentrated hydrochloric acid was added with cooling. Two hundred milliliters of ether and 50 milliliters of water were added, and the solution was stirred until all solids were dissolved and the layers were separated. The ether layer was extracted with sodium bicarbonate solution which was then acidified to yield crude product, which was crystallized from ethanol to give 3-carbethoxy-4-(p-fluorophenyl)-2-oxobutyrolactone having a melting point of 122.5–123.5° C.

*Analysis.*—Calcd. for $C_{13}H_{11}O_5F$: C, 58.62; H, 4.17. Found: C, 58.98; H, 4.31.

What is claimed is:

1. A composition of the formula:

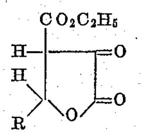

wherein R is a member selected from the group consisting of p-acetamidophenyl and p-fluorophenyl.

2. 3-carbethoxy-4-(p-acetamidophenyl) - 2 - oxobutyrolactone.

3. 3-carbethoxy-4-(p-fluorophenyl) - 2 - oxobutyrolactone.

References Cited by the Examiner

Gault et al.: I Comptes Rendu, vol. 222 (1946), pages 86–8.

Gault et al.: II Comptes Rendu, vol. 222 (1946), pages 185–7.

IRVING MARCUS, *Primary Examiner.*

NICHOLAS S. RIZZO, *Examiner.*

UNITED STATES PATENT OFFICE
CERTIFICATE OF CORRECTION

Patent No. 3,185,711 May 25, 1965

Harold G. Monsimer

It is hereby certified that error appears in the above numbered patent requiring correction and that the said Letters Patent should read as corrected below.

Column 1, lines 14 to 19, the formula should appear as shown below instead of as in the patent:

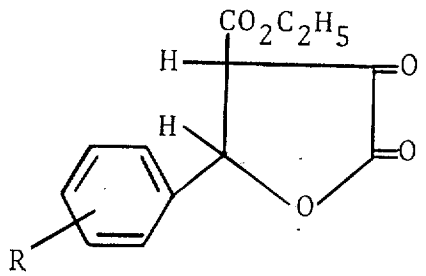

Signed and sealed this 23rd day of November 1965.

(SEAL)
Attest:

ERNEST W. SWIDER
Attesting Officer

EDWARD J. BRENNER
Commissioner of Patents